United States Patent

Stasio

[15] 3,669,074
[45] June 13, 1972

[54] BRINE SHRIMP HATCHERY

[72] Inventor: Robert Stasio, Brooklyn, N.Y.
[73] Assignee: Metaframe Corporation, Maywood, N.J.
[22] Filed: July 7, 1970
[21] Appl. No.: 52,804

[52] U.S. Cl. .................................................................. 119/2
[51] Int. Cl. .............................................................. A01k 61/00
[58] Field of Search ................................................. 119/2, 3

[56] References Cited

UNITED STATES PATENTS

| | | |
|---|---|---|
| 2,920,606 | 1/1960 | Anderson ................................... 119/2 |
| 3,086,497 | 4/1963 | Novello ..................................... 119/2 |
| 3,413,957 | 12/1968 | Steiner...................................... 119/3 |
| 3,540,414 | 11/1970 | Maloney, Jr. ............................. 119/2 |

*Primary Examiner*—Aldrich F. Medbery
*Attorney*—Friedman & Goodman

[57] ABSTRACT

A device for hatching brine shrimp eggs having a main receptacle provided with a removable cover for containing a salt-water solution in which the brine shrimp eggs are to be hatched. The cover is formed with a central opening in which is seated a funnel shaped receptacle having an opening at its bottom end. A plug at the end of a rod serves to close the opening of the funnel shaped receptacle which contains fresh water. Brine shrimp eggs are placed in the salt-water solution and when hatched, the plug in the funnel shaped receptacle is withdrawn allowing the hatched brine shrimp to enter the receptacle through its bottom opening, and are captured therein when the plug is reinserted in the opening.

5 Claims, 2 Drawing Figures

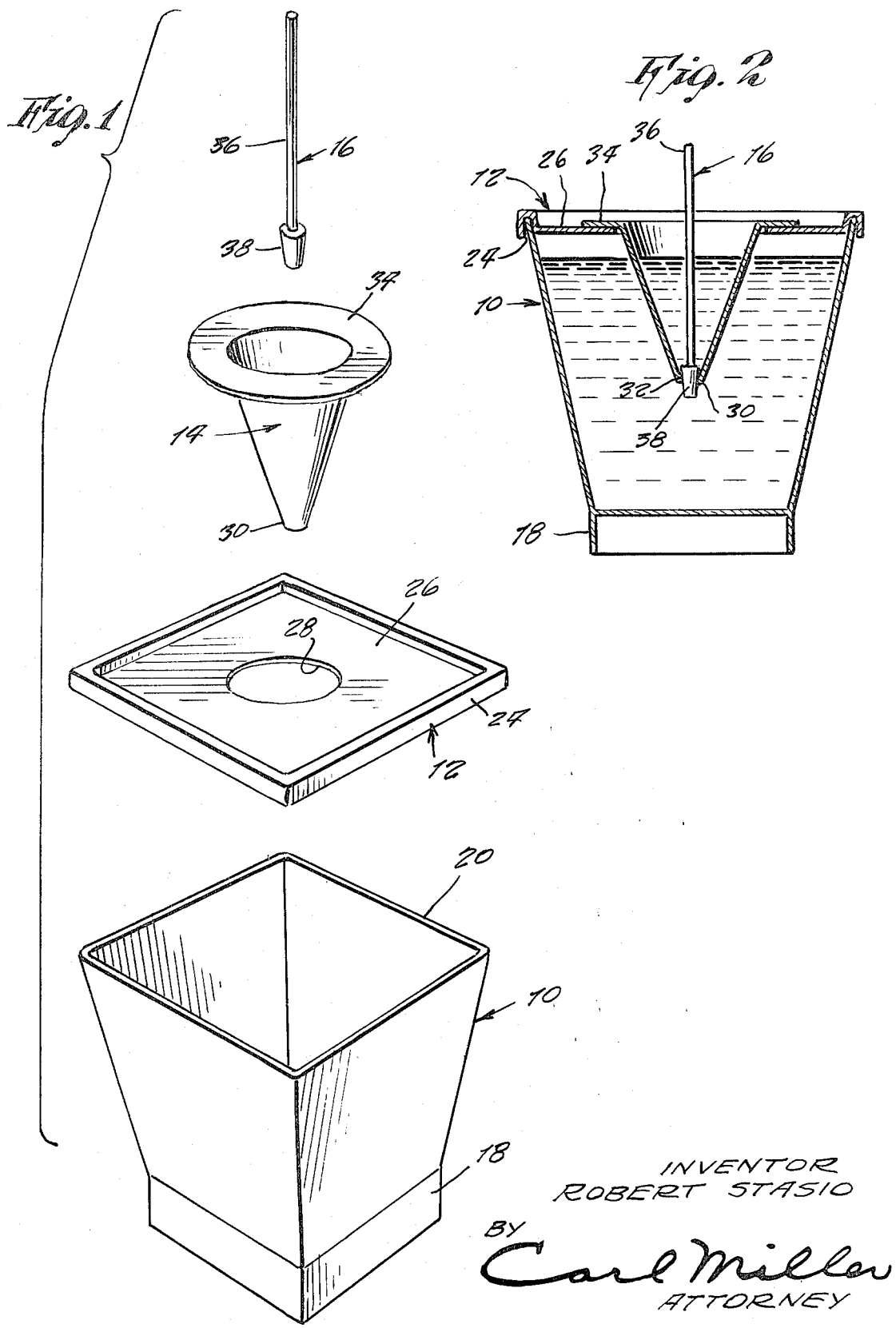

BRINE SHRIMP HATCHERY

This invention relates to apparatus for hatching brine shrimp for feeding fish, and has for its primary object a hatching apparatus having an outer receptacle containing brine shrimp eggs to be hatched in a salt-water solution therein and a fresh-water inner receptacle for capturing within the same hatched brine shrimp, thereby eliminating the step in the present form of hatcheries of washing the shrimp to remove the salt content thereof.

Another object of this invention is to provide the outer receptacle with a removable cover structured to have a snug fit with the upper rim portion of the receptacle, the cover being flat and provided with a central opening.

A further object of this invention is to provide an inner receptacle having a downwardly tapered wall complementally shaped to the opening in the outer receptacle cover and provided at its upper rim with a radial flange for seating engagement on the upper flat surface of the cover with the inner receptacle extending downwardly into the outer receptacle, the lower end of the inner receptacle being formed to provide a throat having an axial opening therein.

Yet another object of this invention is to provide a removable stopper for the throat opening of the inner receptacle having a plug mounted on the lower end of a rod, the plug being shaped to fit within the throat opening to close the same.

Further objects of the invention will appear as the description proceeds.

To the accomplishment of the above and related objects, my invention may be embodied in the form illustrated in the accompanying drawings, attention being called to the fact, however, that the drawings are illustrative only, and that changes may be made in the specific construction illustrated and described within the scope of the appended claims.

In the drawing:

FIG. 1 is a perspective exploded view of the parts of the hatchery apparatus.

FIG. 2 is a vertical cross-sectional view of the hatchery apparatus showing all the parts thereof in operative relationship.

Referring to the drawing in greater detail the hatchery apparatus is seen to consist of an outer receptacle 10, a cover 12, an inner receptacle 14 and a stopper member 16.

The outer receptacle 10 shown in FIG. 1, as four-sided or square in horizontal section, may be round, oval or any desired shape and size provided with a base 18 and a horizontal rim edge 20 at its top. The outer receptacle may be formed of non-corosive metal, glass, plastic or any other suitable material. Complemental in shape to the open upper end of the outer receptacle is the cover 12 which is provided with a downwardly opening peripheral channel 24 shaped to removably and snugly receive therein the upper rim portion 20 of the outer receptacle. The cover 12 is formed with a flat upper wall surface 26 and a relatively large diameter central circular opening 28.

The inner receptacle 14 formed of like material as the outer receptacle 10 is funnel shaped with its large diameter end uppermost and its lower end forming a throat 30 provided with an axial opening 32. At the upper edge of the inner receptacle 14 there is provided an integral outwardly extending radial flange 34. The outer diameter of the funnel shaped inner receptacle 14 in the plane of the bottom surface of radial flange 34 is of a diameter slightly less than the diameter of the cover opening 28 such that the inner receptacle 14 may be readily inserted within the cover opening 28 and held suspended from the cover 14 by the inner receptacle radial flange 34 seating on the top surface 26 of the cover 12, as seen in FIG. 2. The height of the inner receptacle is such that its throat 30 and axial opening 32 will lie substantially mid-way between the top and bottom of the outer receptacle 10 as seen in FIG. 2.

The removable stopper member 16 consists of a rod 36 of a length greater than the axial depth of the inner receptacle, having securely mounted on its lower end a tapered plug 38 shaped to extend into the opening 32 of the throat 30 to close the opening in water sealing engagement. The rod 36 is formed preferable of a non-corrosive metal and the tapered plug 38 may be of rubber, plastic of other suitable material.

In the operation of the hatchery apparatus the brine shrimp eggs are placed in the outer receptacle 10 and a solution of saltwater is poured into the receptacle 10 in such a way as not to agitate it too much to make it overflow. The solution filling the outer receptacle 10 to within one-half inch from the rim edge 20. The cover 12 is placed in position with the upper rim portion of the outer receptacle extending into the inverted channel 24 thereof. The salt water solution in the outer receptacle 10 should be at a temperature between 75° to 80° Fahrenheit and maintained at this temperature for 24 hours or as long as necessary to hatch the brine shrimp eggs. Also the apparatus has to be placed in a lighted area. Normally the eggs will hatch after the above time lapse and the hatched brine shrimp will swim about freely in the inner receptacle. When this occurs, the inner receptacle 14 with the stopper member 16 in place to close or plug up the opening 32 is then inserted through cover opening 28 so as to be suspended from the cover 12 in the salt-water solution, and is filled with clear or fresh water to about one-quarter inch from the top thereof. The plug 38 on rod 36 of the stopper element is withdrawn from opening 32 of the inner receptacle so that the fresh water therein will enter the outer receptacle 10, the water in both receptacles seeking its own level. In a short period of time the shrimp that have hatched will swim through opening 32 into the inner receptacle to be captured therein by reinserting plug 38 of the stopper element into opening 32. The inner receptacle 14 with the entrapped shrimp therein may then be removed from the outer receptacle and brought directly to fish in a tank and fed to the fish by pulling out the stopper element 16, the shrimp dropping into the tank through opening 32.

This method of hatching brine shrimp eggs and entrapping the hatched shrimp in a fresh-water receptacle that is portable eliminates the hitherto customary step of washing the shrimp to remove the salt content, as the portable receptacle contains only fresh water which removes the salt content from the shrimp.

Furthermore, there is also eliminated the need for manually separating the unhatched eggs from the live baby brine shrimp as only the hatched shrimp can enter the inner receptacle by swimming upwardly through opening 32.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

What I claim is:

1. A brine shrimp hatchery apparatus comprising:
   a. an outer receptacle having an upper rim portion defining an open top,
   b. a cover for the open top of the outer receptacle,
   c. an inner receptacle having a lower end extending into the outer receptacle and suspended from the cover,
   d. there being an opening in the lower end of the inner receptacle, and
   e. a removable stopper element for closing the opening in the lower end of the inner receptacle,
   f. said cover including an inverted peripheral channel complemental to said upper rim portion of the outer receptacle for receiving therein in fitted relation said upper rim portion,
   g. there being a central opening in said cover shaped to receive said inner receptacle.

2. The hatchery apparatus of claim 1, wherein:
   a. said inner receptacle being funnel shaped with its smaller diameter end at the bottom thereof forming a throat,
   b. the opening in the lower end of said inner receptacle being axially formed in said throat,
   c. the upper end of said inner receptacle being open,
   d. a radial outwardly extending horizontal flange integral with said inner receptacle at its upper open end, e. said cover opening being circular,
f. said inner receptacle adjacent the underside of its radial flange being of a diameter slightly less than the diameter of said cover opening, and
g. said inner receptacle being held in its suspended position from said cover by the seating engagement of the radial flange thereof on the top surface of said cover.

3. The hatchery apparatus of claim 2, wherein said removable stopper element comprises:
a. a rod of a length greater than the axial depth of said inner receptacle,
b. a plug carried on the lower end of said rod and shaped to partly extend into the axial opening in the throat of said inner receptacle whereby to close said opening in water sealing engagement, and
c. said plug closing opening of the inner receptacle lying substantially mid-way between the top and bottom of the outer receptacle.

4. A brine shrimp hatchery comprising a first receptacle for confining brine shrimp egg-laden fluid, said first receptacle having an open upper end, and a second receptacle for confining fluid therein and having an open lower end detachably extending through said upper open end of said first receptacle, said open lower end of said second receptacle adapted for being submerged in the fluid of said first receptacle, and means associated with said second receptacle for preventing gravitational outflow of fluid in the latter through said open lower end when said second receptacle is removed upwardly and detached from said first receptacle.

5. A brine shrimp hatchery as claimed in claim 4, wherein said means which prevents gravitational outflow includes a removable stopper operatively associated with said open lower end of said second receptacle.

* * * * *